(12) United States Patent
Irmann-Jacobsen et al.

(10) Patent No.: US 9,739,407 B2
(45) Date of Patent: Aug. 22, 2017

(54) MANIFOLD FLOW SPLITTER

(75) Inventors: Tine Bauck Irmann-Jacobsen, Hvalstad (NO); Stein Følkner, Østerås (NO); Bjarte Haegland, Asker (NO); Reidar Barfod Schuller, Drobak (NO); Atle Jensen, Oslo (NO)

(73) Assignee: FMC Kongsberg Subsea AS, Kongsberg (NO)

( * ) Notice: Subject to any disclaimer, the term of this patent is extended or adjusted under 35 U.S.C. 154(b) by 565 days.

(21) Appl. No.: 13/980,567

(22) PCT Filed: Jan. 26, 2012

(86) PCT No.: PCT/EP2012/051237
§ 371 (c)(1),
(2), (4) Date: Oct. 4, 2013

(87) PCT Pub. No.: WO2012/101217
PCT Pub. Date: Aug. 2, 2012

(65) Prior Publication Data
US 2014/0034136 A1    Feb. 6, 2014

(30) Foreign Application Priority Data
Jan. 27, 2011    (NO) .................................. 20110131

(51) Int. Cl.
| B08B 9/02 | (2006.01) |
| F16L 41/02 | (2006.01) |
| F16L 41/03 | (2006.01) |
| F17D 1/00 | (2006.01) |

(52) U.S. Cl.
CPC ............... *F16L 41/02* (2013.01); *F16L 41/03* (2013.01); *F17D 1/005* (2013.01); *Y10T 137/0318* (2015.04); *Y10T 137/85938* (2015.04)

(58) Field of Classification Search
CPC .......... F16L 41/02; F16L 41/03; B01F 5/0475
USPC .................................. 137/561 A, 599.14, 883
See application file for complete search history.

(56) References Cited

U.S. PATENT DOCUMENTS

| 2,163,591 | A | * | 6/1939 | Deverall | ................. F25B 39/02 |
| | | | | | 137/109 |
| 4,450,899 | A | | 5/1984 | Jakobsson et al. | |
| 4,709,947 | A | * | 12/1987 | Kniess | ....................... 285/131.1 |
| 4,800,921 | A | | 1/1989 | Greebe | |

(Continued)

FOREIGN PATENT DOCUMENTS

| FR | 1218431 | 5/1960 |
| GB | 958481 | 5/1964 |

(Continued)

*Primary Examiner* — Reinaldo Sanchez-Medina

(57) ABSTRACT

The present invention regards a manifold for use in a flow system, comprising a longitudinal main pipe section (1) with one inlet (13) connectable to a feed pipe (9) and at least two outlets (14) arranged in a row along the main pipe section (1), where a center axis (15) of the main pipe section (1) during normal use extends in a mainly horizontal direction. The outlets (14) are arranged in a lower half of the main pipe section (1) and connected to outlet pipe sections (22) arranged with a center axis (21) extending with an downward angle from the main pipe section (1). The invention also regards a method for distributing a mixed flow into several pipes and a method for cooling a multiphase fluid.

9 Claims, 3 Drawing Sheets

(56) References Cited

U.S. PATENT DOCUMENTS

| | | | |
|---|---|---|---|
| 6,783,429 B2* | 8/2004 | Nicholes | G01N 15/0205 137/888 |
| 7,168,448 B2* | 1/2007 | Schmidt | 137/561 A |
| 2008/0196435 A1 | 8/2008 | Schulze | |
| 2008/0276998 A1* | 11/2008 | Boyher et al. | 137/561 A |
| 2011/0116984 A1* | 5/2011 | Rehmat et al. | 422/184.1 |
| 2012/0298226 A1* | 11/2012 | Struempler | F24F 3/06 137/561 A |

FOREIGN PATENT DOCUMENTS

| | | |
|---|---|---|
| GB | 2 172 391 A | 9/1986 |
| GB | 2 250 328 A | 6/1992 |
| JP | 2009-243644 A | 10/2009 |

* cited by examiner

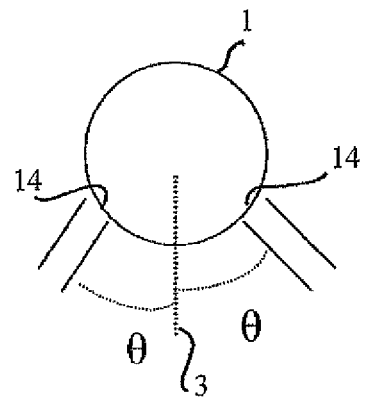
Fig. 4C
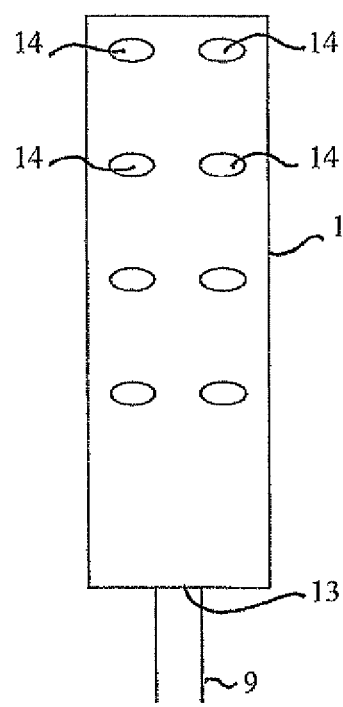 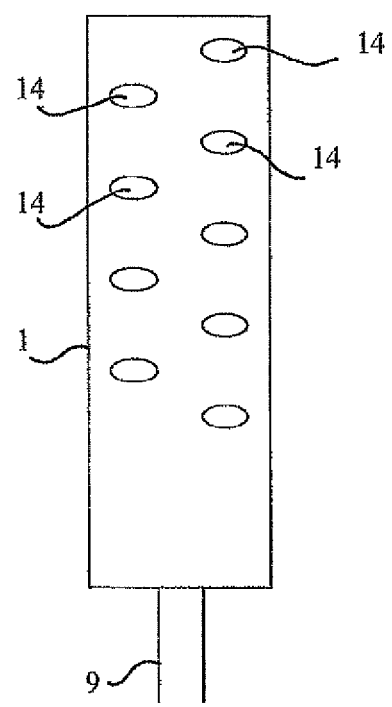
Fig. 5A    Fig. 5B

MANIFOLD FLOW SPLITTER

BACKGROUND OF THE INVENTION

The present invention relates to a device and methods for dividing a multiphase flow into several flows which has substantially the same mixture of phases.

When oil and or gas are produced from subsea wells, the produced fluid is often a multiphase mixture. There may also be a need for treating this multiphase mixture flow, for instance cooling it before it is separated into the different substances as gas, oil, water, sand or other fluids following the multiphase flow. When for instance cooling a flow it is favorable to have smaller amounts to be cooled to ensure the necessary cooling and then it would be favorable to split the multiphase flow into several mainly equal smaller flows.

Proper distribution of such a multiphase flow is challenging. The flow composition may differ between the outlets in a splitting point and in the extreme one outlet may contain only gas or liquid. For subsea systems it is for several reasons necessary to have control of the splitting between parallel flow lines, process systems or process equipment; 1) for equal loading; 2) for assurance of sufficient inhibited liquid.

A solution for systems with small liquid volume flow compared to gas volume flow has been especially challenging. The challenge concerns equal distribution of liquid and gas in general. This application is important if MEG is present in a gas-condensate system and need to be equally distributed into several pipes to avoid hydrate formation. It can also be important if equal loading of flow rates into two or more lines is required.

There are some known solutions for providing splitting of a multiphase flow into several flow paths. U.S. Pat. No. 4,293,025 describes a flow splitter using a tank having an inlet and two outlets where the outlets are configured as vertical standpipes extending partway into the tank. The fluids enter into the tank from the top and are prevented from directly entering into the standpipes by baffles. Liquid gathers at the bottom of the tank. The standpipes in this system are perforated such that the liquid enters the standpipes through the perforations while vapour enters into the standpipes from the top. This device is used for distributing a liquid-vapour mixture for a heat exchanger. In U.S. Pat. No. 7,261,120 there is shown a similar arrangement but here the standpipes are located at the top end of the tank and projecting downwards into the tank while the inlet is located at the bottom. The standpipes in this system are also perforated. U.S. Pat. No. 4,662,391 describes a flow splitter for liquid-vapour mixtures which is basically in the shape of a four-way piping hub. The hub has an inlet and a bottom drain directly opposite the inlet and two outlets perpendicular to the inlet. Fluid will collect in the central chamber of the hub. When the liquid accumulates to the point where it reaches the edge of the side outlets the liquid divides equally among the two outlets to become re-entrained with a substantially equal portion of the vapour passing through each outlet. The drain is used to regulate the height of the fluid in the central chamber.

None of these solutions gives a satisfying solution for splitting a multiphase flow especially when the use of the equipment is subsea. An aim with the present invention is therefore to provide an alternative device and method for obtaining a splitting of a multiphase flow to several smaller flows which has mainly equal content when looking at the different fluids in the flow.

SUMMARY OF THE INVENTION

This is achieved with a manifold and methods as defined in the attached claims, where further details of the invention is given in the dependent claim and the following description.

According to the invention there is provided a manifold for use in a flow system. A manifold is as for a normal definition a pipe or chamber branching into several openings. The manifold is connectable to a feed pipe. According to the invention the manifold is formed with a lower part having an inner surface formed as a half cylinder with a longitudinal axis oriented mainly horizontal direction during normal use. The inner surface may also be formed with a full cylinder surface. There are in this inner surface arranged at least two outlets in a row oriented mainly parallel with the longitudinal axis. These outlets are connected to outlet pipe segments arranged with a centre axis of these pipe segments extending with a downward angle from the lower part of the manifold.

According to one aspect the manifold may be formed by a longitudinal main pipe section, where the pipe has a mainly circular cross section. The inlet of the manifold may be arranged at one end of this main pipe section. The centre axis of the main pipe section would then form the longitudinal axis of the manifold, and during normal use extend in a mainly horizontal direction. The outlets would then be arranged in a lower half of the main pipe section and connected to outlet pipes arranged with a centre axis extending with a downward angle from the main pipe section.

According to an aspect the outlets may be arranged, when seen in a cross section of the lower part of the manifold or the main pipe section, with a main axis of the pipe segments connected to the outlets, forming an angle between 35-50 degrees in relation to a vertical axis.

According to another aspect the outlets may be arranged at a position and connected to the outlet pipes such that a main axis of the outlet pipe segments, at the outlet, forms an angle of 45 degrees with a vertical axis.

According to yet another aspect the outlet pipes may be such connected to the main pipe that a centre axis of the outlet pipes, at the outlet, crosses the longitudinal axis of the lower part of the manifold or the main pipe section.

According to yet another aspect there may to the lower part of the manifold or the main pipe sections be arranged two rows of outlets in the lower part or the lower half of the main pipe section. In one embodiment the outlet of one row is arranged in the same transverse plane as an outlet in the other row, in another embodiment the outlet in one row is arranged in a transverse plane in between transverse planes of neighboring outlets in the other row.

According to another aspect the one inlet is arranged at one end of the main pipe section. The first outlet is then arranged in a distance from the inlet. In another embodiment there are two inlets one on each end of the longitudinal axis of the manifold.

According to the invention there is also provided a method for distributing a mixed flow into several pipes, comprising leading the flow mixture into a horizontal pipe where a liquid phase of the mixed flow would position itself in a lower part of the pipe and a gas phase in the rest of the cross section of the pipe, then taking mixture out of the pipe in outlet pipes arranged at 30-50 degrees with a vertical axis, in the lower part of the pipe. In one embodiment the mixture is taken out into outlet pipes arranged at 45 degree with a vertical axis.

According to the invention there is also provided a method for cooling a multiphase fluid, comprising leading the multiphase fluid into a manifold according to the invention as described above and thereby splitting the flow into several multiphase flow fractions, then cooling each of the flow fractions separately and thereafter collecting the flow fractions to a common multiphase flow.

BRIEF DESCRIPTION OF THE DRAWINGS

The invention will now be explained with non-limiting embodiments with reference to the attached drawings where;

FIGS. 5A and 5B show a principles sketch of a main pipe section seen in a vertical direction from underneath.

DETAILED DESCRIPTION OF THE INVENTION

Figure 1:
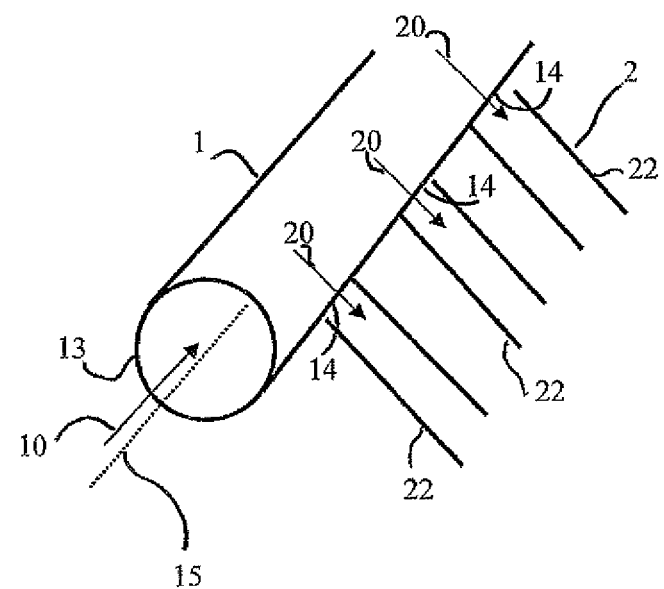
FIG. 1 shows a principle sketch of the flow splitting manifold according to the invention, FIG. 2 show a cross section through the manifold

In FIG. 1 there is shown a principle sketch of part of a manifold according to the invention. The manifold, which is a device for splitting flow into several flows, comprises a main pipe section 1 with a centre axis 15; having an net 13 at one end of the main pipe section 1. A fluid mixture 10 is introduced through this net 13. Along the main pipe section 1 there are arranged several outlets 14. These outlets 14 are arranged in a row along the main pipe section 1 and in a lower half of the pipe, when it has a normal use configuration, and they are connected to outlet pipes 2. The outlet pipes 2 have, a least for a section 22 of the outlet pipes 2, which section 22 is connected to the outlets 14, an orientation which is pointed downwards. A center axis 21 of the outlet pipe section 22 forms an acute angle 8 with a vertical axis 3 with the open end of the angle oriented downwards, as may best be seen from FIG. 2. A center axis 21 of the outlet pipe section 22 may also preferably cross a center axis of the main pipe section 1.

Figure 2:
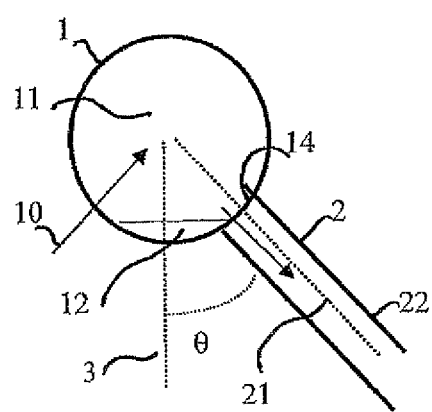

As shown in FIG. 2, the mixed fluid flow 10 entered into the main pipe section 1 will quickly divide itself in a liquid part 12 with mostly liquid in the bottom of the main pipe section 1, and a more gas part 11 in the relatively upper part of the main pipe section 1. Positioning the outlet 14 with the outlet pipe section 22 pointed downwards with an angle θ between 35 degrees and 50 degrees, and preferably of 45 degrees, gives a beneficial and similar fraction mixture 20 of the gas part 11 and the liquid part 12 in the main pipe section ire each of the outlet pipe sections 22.

Figure 3:
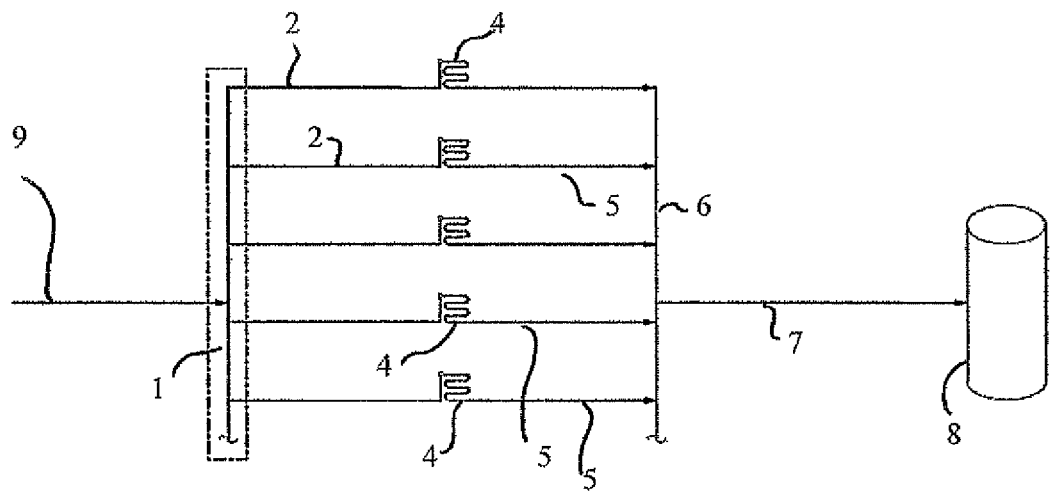
FIG. 3 shows a principle sketch of a use of a manifold according to the invention.

In FIG. 3 there is shown a possible use of the manifold according to the invention. A feed pipe 9 is connected to the main pipe section 1, whereto there are connected several outlet pipes 2. The outlet pipe section 22 may only form a smaller part of the total length of the outlet pipe 2. Each outlet pipe is further connected to respective cooler unit 4 for cooling down the fraction mixture 20. After the cooler units a pipe section 5 leads into a collector pipe 6, which collects all the cooled mixture fractions 20 to a main mixture 10 again and leads it through a common pipe 7 to a unit 8, for instance a separator. The number and configuration of each cooling unit 4 and the amount of inhibitors to be injected into the system are easier to calculate as the effect of cooling a smaller fraction compared with a main stream is relatively easier.

Figure 4A:
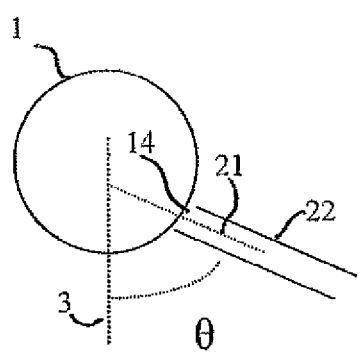
FIGS. 4A, B and C shows cross section through a manifold of different embodiments.
Figure 4B:
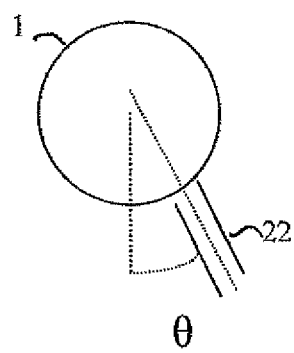

In FIGS. 4A and 4B there are shown a cross section where the outlets 14 of the main pipe 1 connected to the outlet pipe sections 22 with a center axis 21, are shown forming different angles θ, between 35 and 59 degrees with a vertical axis 3. There is also shown that the center axis 21 may not cross a center axis of the main pipe 1. In FIG. 4C there is shown yet another embodiment where there in this embodiment are two rows of outlets 14 in the lower part of the main pipe 1. The outlets 14 both form the same angle θ with a vertical axis 3. As shown in FIGS. 5A and 5B where there is shown a principle sketch of the main pipe 1 seen from beneath up along a vertical axis, the two rows of outlets 14 may be formed in parallel or they may be formed staggered along the main pipe 1. The outlets 14 of both rows may be formed in pairs arranged in a common plane arranged transverse to the centre axis of the main pipe, or they may be formed such that an outlet of one row is arranged in another transverse plane to the center axis compared with an outlet in the other row of outlets. In this figure one may also see that the outlets 14 are formed with a distance from the inlet 13 connected to the feed pipe 9.

The invention has now been explained with reference to non-limiting embodiments shown in the figures. A skilled person will understand that there may be made modifications and alterations to these embodiments that are within the scope of the invention as defined in the attached claims.

The invention claimed is:

1. A manifold for use in a flow system, comprising:
    a longitudinal main pipe section with one inlet connectable to a feed pipe and at least two outlets arranged in a row along the main pipe section, a centre axis of the main pipe section during normal use extending in a mainly horizontal direction;
    wherein each outlet is arranged in a lower half of the main pipe section and is connected to a corresponding outlet pipe section having a centre axis extending at a downward angle from the main pipe section; and
    wherein all of the outlets are arranged, when seen in a cross section of the main pipe section, with the centre axis of each of the outlet pipe sections in separate planes perpendicular to the centre axis of the main pipe section and forming an identical angle θ of between 35 degrees and 50 degrees in relation to a vertical axis.

2. The manifold according to claim 1, wherein the angle θ is 45 degrees in relation to the vertical axis.

3. The manifold according to claim 1, wherein the outlet pipe sections are connected to the main pipe section such that the centre axes of the outlet pipes sections cross the centre axis of the main pipe section.

4. The manifold according to claim 1, wherein two rows of outlets are arranged in the lower half of the main pipe section.

5. The manifold according to claim 4, wherein an outlet in one row is arranged in the same transverse plane as an outlet in the other row.

6. The manifold according to claim 1, wherein the inlet is arranged at one end of the main pipe section.

7. A method for distributing a mixed flow into several pipes, comprising: leading the mixed flow into a horizontal pipe where a liquid phase of the mixed flow positions itself in a lower cross section of the pipe and a gas phase of the mixed flow positions itself in the rest of the cross section of the pipe, then removing a mixture of the liquid phase and the gas phase out of the pipe through at least two outlet pipe sections which are each connected to a corresponding outlet in a lower part of the pipe, each outlet pipe section comprising a respective centre axis and being arranged, when seen in a cross section of the horizontal pipe, with the centre axis of the outlet pipe section in a separate plane which is perpendicular to the centre axis of the horizontal pipe and at an identical angle $\theta$ of 30 degrees to 50 degrees with respect to a vertical axis; wherein the liquid phase is removed from the pipe through a lower part of the cross section of each outlet and the gas phase is removed from the pipe through the rest of the cross section of each outlet.

8. The method according to claim 7, wherein the angle $\theta$ is 45 degrees with respect to the vertical axis.

9. A method for cooling a multiphase fluid, comprising:
leading the multiphase fluid into a manifold and thereby splitting the fluid into several multiphase flow fractions; then
cooling each of the flow fractions separately; and then
combining the flow fractions into a common multiphase flow;
wherein the manifold comprises a longitudinal main pipe section having one inlet connectable to a feed pipe and at least two outlets arranged in a row along the main pipe section, a centre axis of the main pipe section during normal use extending in a mainly horizontal direction, each outlet being arranged in a lower half of the main pipe section and being connected to a corresponding outlet pipe section having a centre axis which extends, when viewed in a cross section of the main pipe section, at an angle $\theta$ of between 35 degrees and 50 degrees in relation to a vertical axis; and
wherein, when seen in a cross section of the main pipe section, the centre axis of each outlet pipe section is positioned in a separate plane which is perpendicular to the centre axis of the main pipe section.

* * * * *